UNITED STATES PATENT OFFICE.

WILLIAM C. ARSEM, OF SCHENECTADY, NEW YORK, ASSIGNOR TO GENERAL ELECTRIC COMPANY, A CORPORATION OF NEW YORK.

SILICIOUS MATERIAL OF LOW DENSITY.

1,077,950. Specification of Letters Patent. Patented Nov. 4, 1913.

No Drawing. Application filed June 24, 1912. Serial No. 705,382.

*To all whom it may concern:*

Be it known that I, WILLIAM C. ARSEM, a citizen of the United States, residing at Schenectady, county of Schenectady, State of New York, have invented certain new and useful Improvements in Silicious Material of Low Density, of which the following is a specification.

It is the object of my present invention to provide a refractory material of low apparent density which is of especial value as a heat insulator although useful as well for other purposes.

When a viscous material, such as an alkali silicate, containing considerable water is heated to an elevated temperature the rapid evaporation of water causes the material to swell up, or intumesce, to form a light, cellular froth having a volume anywhere from 30 to 100 times greater than the original material. When the partially dehydrated viscous material is comminuted and the particles subjected to further heating the particles swell up to form distinct, frothy pellets or bubbles of very low density.

In accordance with my present invention, the intumescent material formed in this manner is converted to a more refractory material without essentially changing its structure. For example, the alkali silicate is converted by means of an acid to silica, or by means of a salt to silicate more refractory than the alkali silicate without necessarily destroying the cellular structure of the intumescent material.

The novel features of my invention are pointed out with greater particularity in the appended claims.

According to one method of carrying my invention into effect the intumesced material is first prepared as follows: A solution of sodium or potassium silicate, known also as "water glass" has its water content reduced by evaporation to about 15-30%, preferably to about 20%. The material is then heated to a temperature of 300-400° C. to cause it to puff up, or intumesce. I prefer to previously crush the silicate which is quite brittle when containing about 15-30% of water. The crushed mass is sifted and segregated, the finer particles being retained and used for the intumescing process. I prefer particles retained by a sieve having 10 to 60 meshes per square inch. The particles in this case are heated to a temperature of 300 to 400° C. while being agitated to avoid sticking. The product consists of bubble-like pellets having an apparent density per given volume of .01 to .03. I do not lay claim herein to this product, the same being described and claimed in a patent issued to Walter Arthur on October 15, 1912, No. 1,041,565.

Intumesced alkali silicate either in massive or coherent form, or in the state of distinct bubbles or puffy particles, is treated according to one modification of my invention with a dilute acid such as hydrochloric acid. The time required for treatment depends somewhat upon the concentration of the acid, and somewhat upon the temperature. The treatment is continued until the material after washing contains little or no sodium. When using a solution containing 11% HCl by weight, the treatment should be continued for about 24 hours at room temperature. This treatment decomposes the silicate, converting it into silicic acid, ($SiO_2 + H_2O$) and the alkali salt of the acid which has been employed. For example, when thus treating sodium silicate there is formed silicic acid and sodium chlorid. The material is then preferably washed and dried. The silicic acid may then be converted into silica, $SiO_2$, by firing to a temperature of 400° C. or higher. In some cases, the alkali salt may be left in the finished product without detriment. The product is structurally pseudomorphic of the intumesced silicate. In other words, each particle of silicate has been converted *in situ* to silicic acid and finally to silica without substantially changing the physical structure of the material, as the intumesced water glass is but very slightly soluble in water. The final product has a melting point of about 1650° C. and a density approximating that of the intumesced silicate. Because of this low density and cellular structure the material is a very efficient heat insulator. Its heat capacity also is correspondingly low.

According to another modification of my invention, the intumesced silicate is treated with an acid vapor, for example, by the vapor of hydrochloric acid. After the treatment with acid vapor the material may be washed if desired, and after drying fired as above indicated.

According to still another modification of my invention, the intumesced silicate is treated with a solution which will convert the same into an insoluble material other than silicic acid. For example, it may be treated with a solution of salt of a metal forming an insoluble silicate, such as salts of aluminum, magnesium, calcium, barium, and the like. In this case, a double decomposition is effected with the formation of an insoluble silicate and the alkali salt of the acid radical of the compound with which the silicate is treated. For example, when an intumesced sodium silicate is treated with aluminum sulfate there is formed insoluble aluminum silicate and sodium sulfate. If desired the sodium sulfate may be removed by washing but in this case may as well be left in the material without detriment.

Other examples might be cited illustrating the general procedure of converting the frothy silicate to more refractory material. The silicate may be treated with a solution of fluosilicic acid, $H_2SiF_6$ which will result in the formation of silicic acid and sodium fluo-silicate.

What I claim as new and desire to secure by Letters Patent of the United States, is:

1. A new manufacture comprising a material consisting of cellular silica, in the state of a pseudomorph of intumesced alkali silicate.

2. A new manufacture comprising a material consisting of distinct frothy particles of silica, having the form of a cellular pseudomorph of intumesced silicate.

3. The process which consists in treating a puffed, or intumesced material with a substance which will react therewith to form a more refractory material having the physical form of the original intumesced material.

4. The process which consists in heating a water-containing alkali silicate to a temperature at which the water is driven off with intumescence and then treating with a reagent to convert the silicate *in situ* to a more refractory material.

5. The process which consists in heating a water-containing alkali silicate to a temperature at which the water is driven off with intumescence, then treating with dilute hydrochloric acid to convert the silicate into silicic acid having the physical form of the particles of the silicate thus treated, and finally heating to convert the silicic acid into silica.

6. The process which consists in treating an intumesced alkali silicate with an acid to decompose the silicate and convert the same to silicic acid, having the general form of the intumescent silicate, and then heating to convert the silicic acid into silica.

7. A heat insulating material consisting at least in part of silica and comprising pellets of low density having a structure pseudomorphic of intumesced silicate of an alkali metal.

8. The process of making refractory heat-insulating material which consists in heating pellets of alkali silicate to about 300° to 400° C. to intumesce the same, treating with dilute acid to convert the silicate to silicic acid having a structure similar to the silicate, and finally converting the silicic acid to silica.

In witness whereof, I have hereunto set my hand this 22nd day of June 1912.

WILLIAM C. ARSEM.

Witnesses:
  MARY E. CHRISTIE,
  HELEN ORFORD.